United States Patent [19]

Uozumi

[11] 4,274,338

[45] Jun. 23, 1981

[54] TRANSVERSELY ADJUSTABLE SUSPENSION SYSTEM

[75] Inventor: Yukio Uozumi, Kobe, Japan

[73] Assignee: Kawasaki Jukogyo Kabushiki Kaisha, Hyogo, Japan

[21] Appl. No.: 26,544

[22] Filed: Apr. 2, 1979

[30] Foreign Application Priority Data

Apr. 3, 1978 [JP] Japan .................. 53-38967

[51] Int. Cl.³ .................. B61B 13/04; B61F 9/00; B61F 13/00
[52] U.S. Cl. .................. 105/144; 104/119; 104/247; 105/197 B; 105/218 A; 267/15 A; 280/95 R
[58] Field of Search .................. 105/144, 197 B, 199 S, 105/218 A; 104/119, 130, 245, 247; 267/15 A, 35, 65 A; 280/95 R

[56] References Cited

U.S. PATENT DOCUMENTS

| | | | |
|---|---|---|---|
| 2,045,027 | 6/1936 | Sanford | 267/15 A X |
| 2,101,024 | 12/1937 | Heinze | 104/247 |
| 2,226,605 | 12/1940 | Geyer et al. | 267/35 X |
| 2,552,690 | 5/1951 | Poirier | 280/95 R X |
| 2,835,521 | 5/1958 | White | 280/95 R X |
| 2,903,256 | 9/1959 | Weiss | 267/15 A |
| 3,872,794 | 3/1975 | Goode | 104/247 |

*Primary Examiner*—John P. Silverstrim
*Assistant Examiner*—Howard Beltran
*Attorney, Agent, or Firm*—Fleit & Jacobson

[57] ABSTRACT

A guided vehicle having a body with rubber-tired steerable running wheels mounted on axles. A suspension system for the axles includes transversely extending upper and lower link arms which are parallel with each other and have equal arm lengths. Each of the links or link arms has one end connected with the wheel axle through a joint mechanism for a steering movement and a rotative movement about a longitudinal axis and its other end connected at two longitudinally spaced portions with the vehicle body for rotative movement about a second longitudinal axis. Air springs are disposed between one of the links and the vehicle body for normally maintaining the links substantially horizontally to thereby maintain the associated wheel always vertical.

8 Claims, 16 Drawing Figures

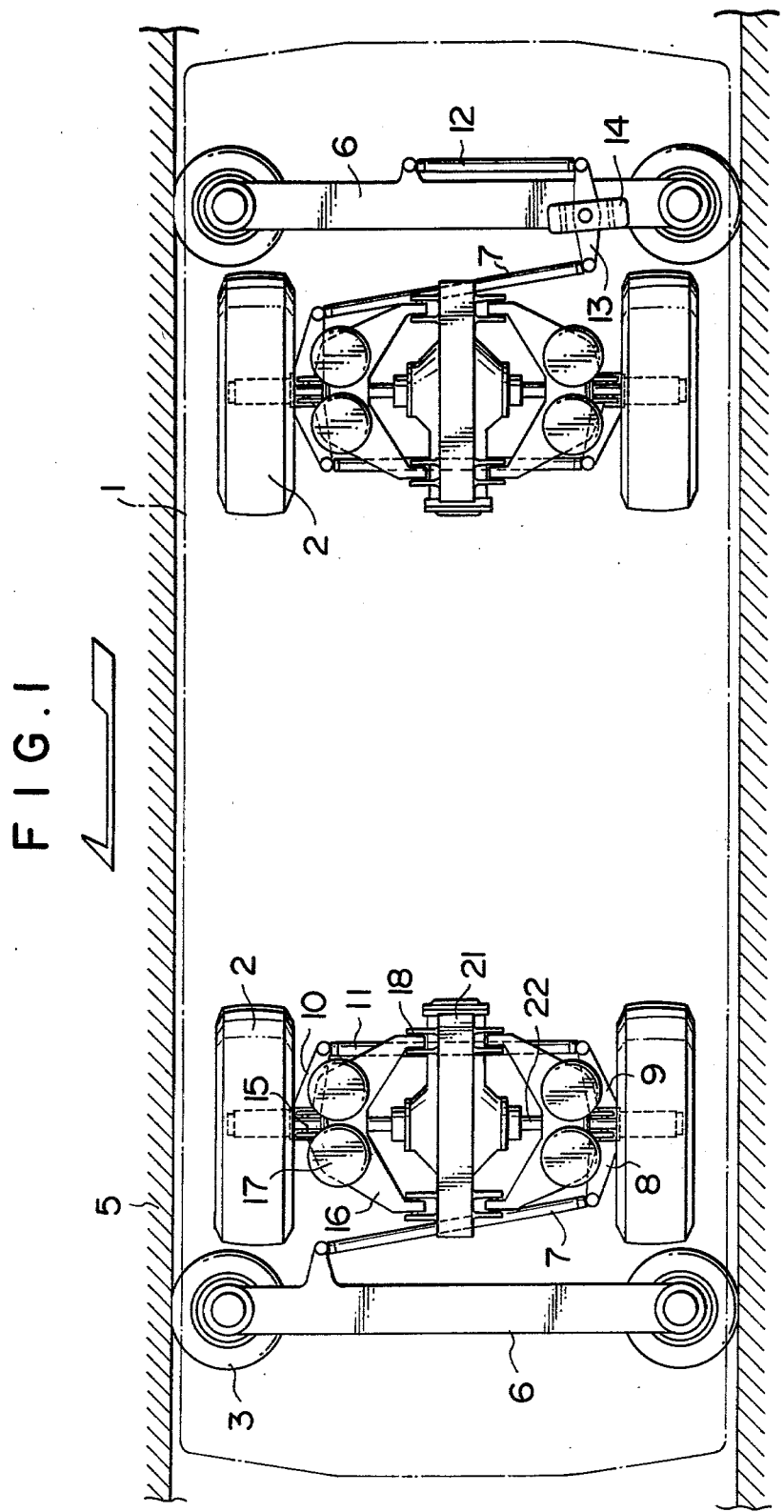

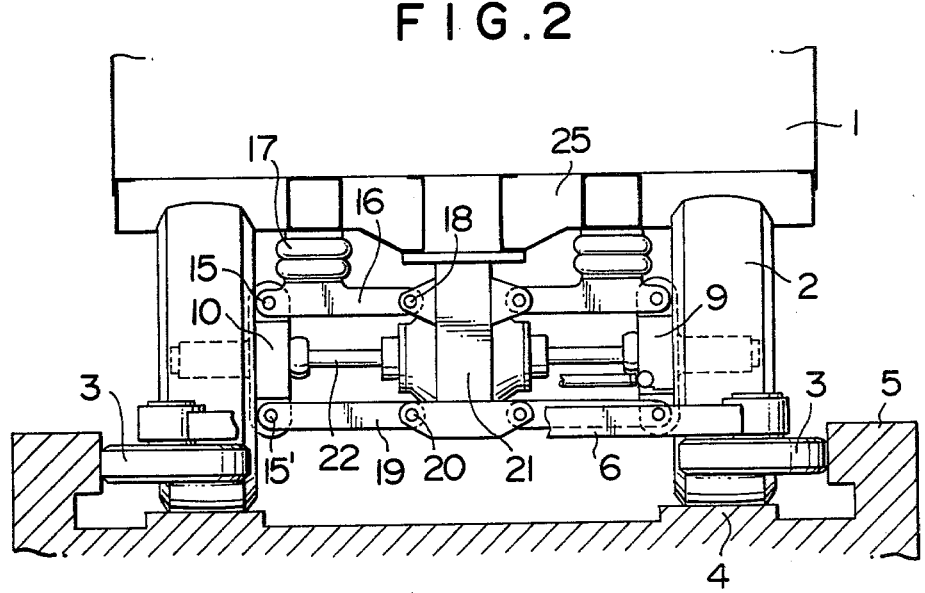
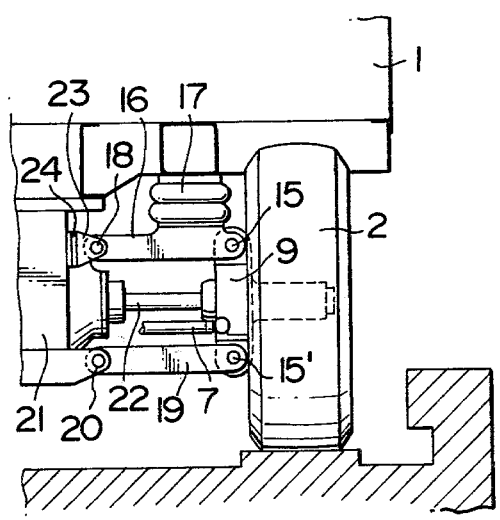
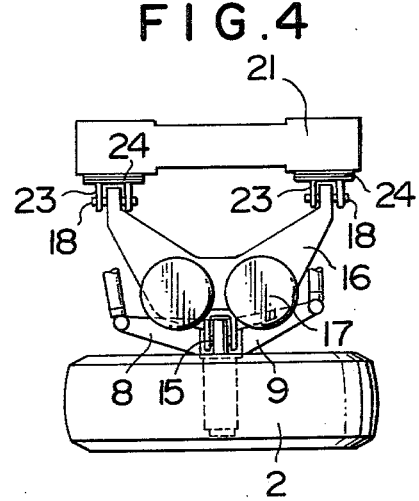
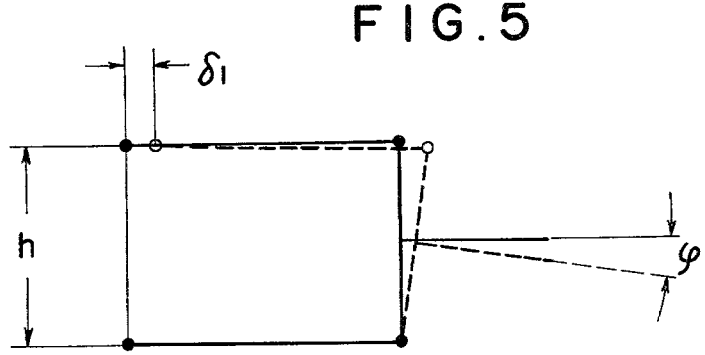

TRANSVERSELY ADJUSTABLE SUSPENSION SYSTEM

The present invention relates to guided vehicles having steerable rubber-tired running wheels adapted to carry vehicle loads and guide wheels adapted to rotate along guide tracks and associated with the running wheels so as to effect steering movements of the running wheels. More specifically, the present invention pertains to suspension systems for such vehicles.

Known suspension systems for connecting rubber-tired running wheels to vehicle bodies include a so-called double wish-bone type which has a pair of parallelly arranged upper and lower swingable links. In this type, the upper and lower links have different lengths and extend in an inclined direction. This type of suspension system is considered as being effective to provide a comfortableness, however, a disadvantage is that rubber tires are relatively rapidly worn since the camber angles of the wheels are changed in response to vertical movements of the wheels and lateral movements of the tires are produced as the links are swung.

It is therefore an object of the present invention to provide a vehicle suspension system by which tire wear can be significantly decreased without sacrificing comfortableness and which can support the steerable wheels in a positive manner so that stable steering characteristics can be obtained even under a high speed operation of the vehicle.

Another object of the present invention is to provide a vehicle suspension system in which the camber angle and the caster angle of the wheel can readily be adjusted and the wheel can be maintained at the adjusted position for a long period.

A further object of the present invention is to provide a vehicle suspension system which is suitable for use with air spring means.

Still further object of the present invention is to provide a vehicle suspension system which includes reliable friction means for ensuring stable steering characteristics.

According to the present invention, there is provided a vehicle suspension system including upper and lower link arms which are parallel with each other and have equal arm lengths, each of said links having one end connected with the wheel axle through joint means at least for steering movement and a rotative movement about a longitudinal axis and the other end connected at longitudinally spaced portions with the vehicle body for rotative movement about a second longitudinal axis, air spring means disposed between one of the links and the vehicle body for normally maintaining said links substantially horizontally to thereby maintain the associated wheel always vertical. Thus, transverse displacement of the wheel is very small even when the wheel is moved in vertical direction. Such small transverse displacement of the wheel can be absorbed by a resilient deformation of the tire so that there is no possibility of lateral slip of the tire. Wear of the tire can therefore be minimized.

Since each of the upper and lower links is connected with the body at longitudinally spaced portions, an adequate rigidity can be provided to constrain the link against movement about a vertical axis. Thus, the link mechanism can support the wheel in a positive manner and it becomes possible to effect adjustment of the wheel in respect of the camber and caster angles. The air spring means adopted in accordance with the present invention is effective to provide a preferable frequency characteristics in vertical direction. The air spring means may be provided between the upper link and the body and the upper link may be connected with the body through ball or cross-type joint means so that vertical loads are transmitted by means of such joint means. The arrangement is considered as being advantageous in that an appropriate friction force can be produced in the joint means in response to a steering movement so that any divergent steering movement can be suppressed even under a high speed operation of the vehicle to thereby provide a stable steering. It is therefore possible to suppress any yawing or rolling movement of the vehicle.

The above and other objects and features of the present invention will become apparent from the following descriptions of preferred embodiments taking reference to the accompanying drawings, in which;

FIG. 1 is a plan view showing wheel arrangements of a guided vehicle having a suspension system in accordance with one embodiment of the present invention;

FIG. 2 is a front view of the suspension system shown in FIG. 1;

FIG. 3 is a fragmentary front view showing another embodiment of the present invention;

FIG. 4 is a plan view of the suspension system shown in FIG. 3;

FIG. 5 is a diagrammatical view showing the principle of camber adjustment in the suspension mechanism shown in FIGS. 3 and 4;

Figure 6:
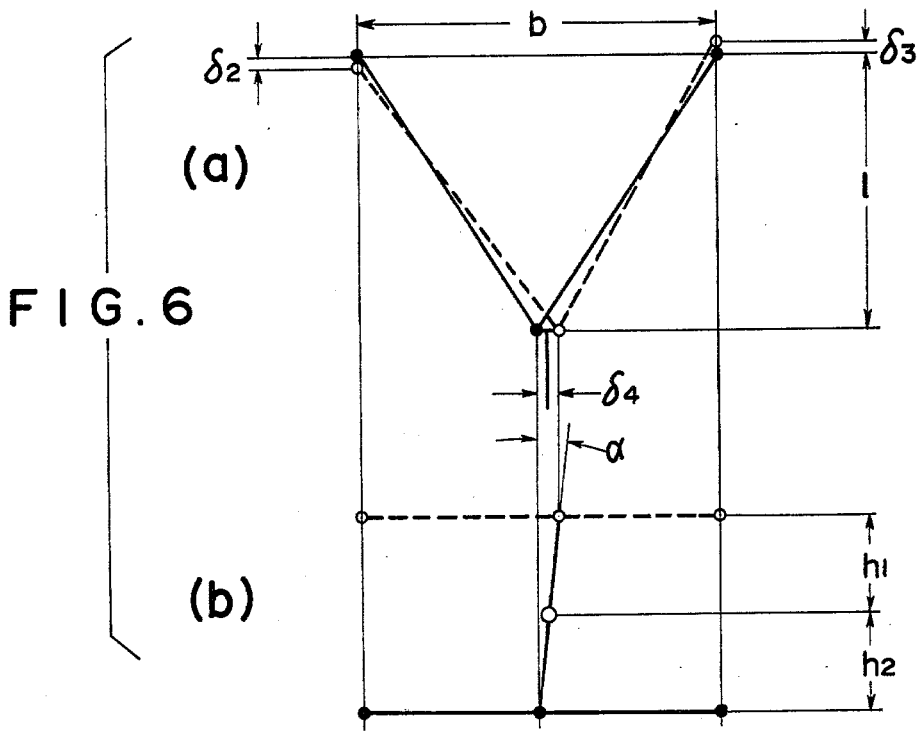
Figure 7:
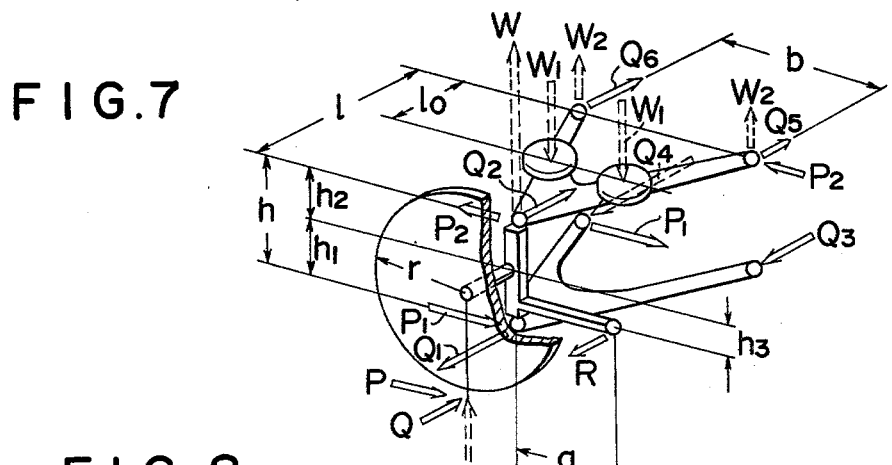
Figure 8:
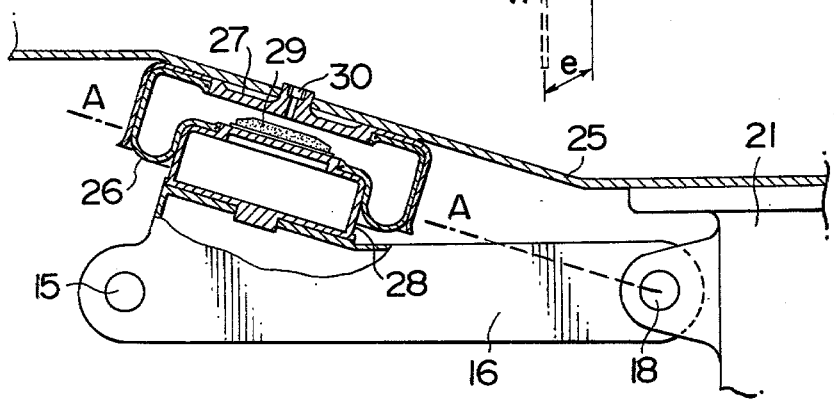
Figure 9:
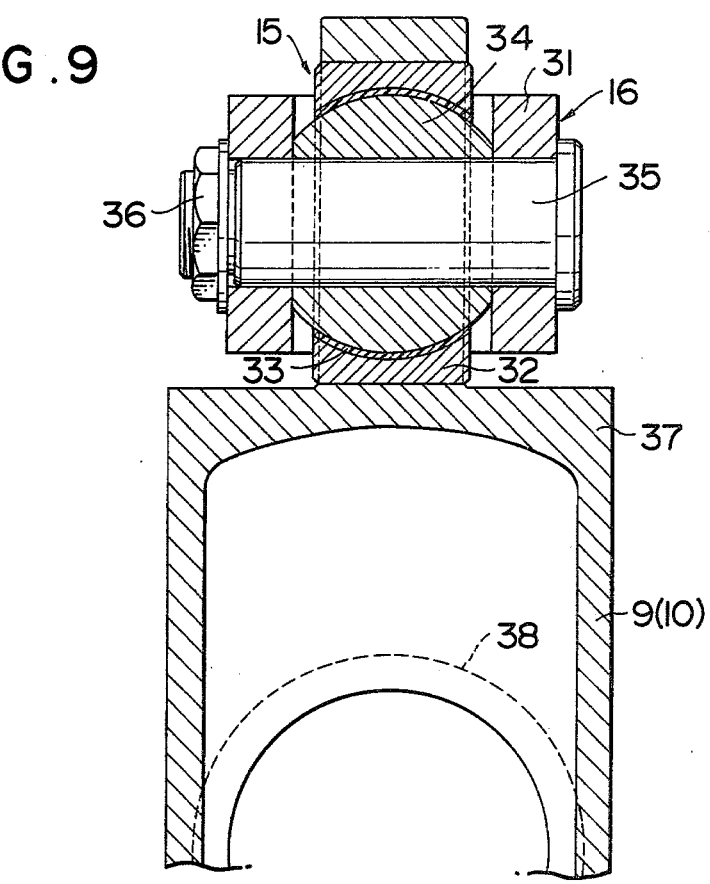
Figure 10:
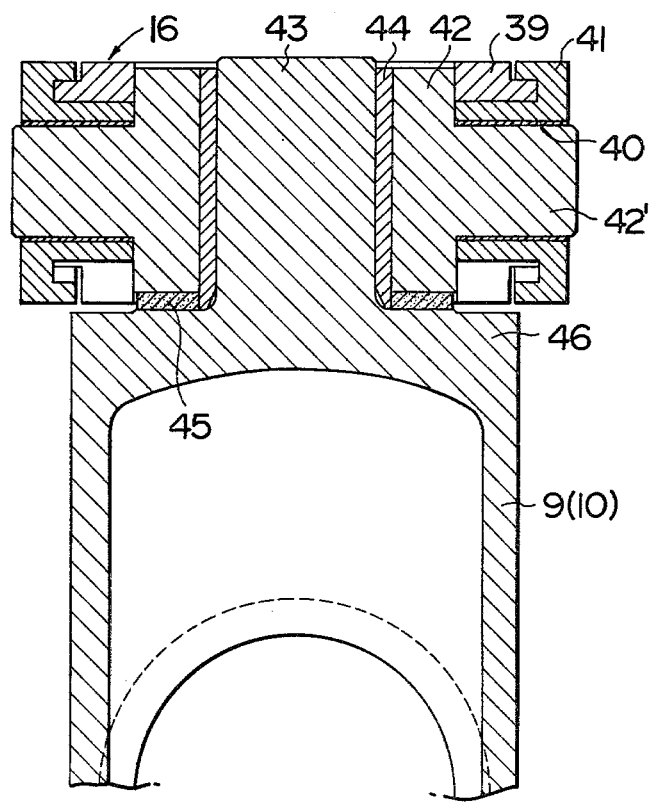
Figure 11:
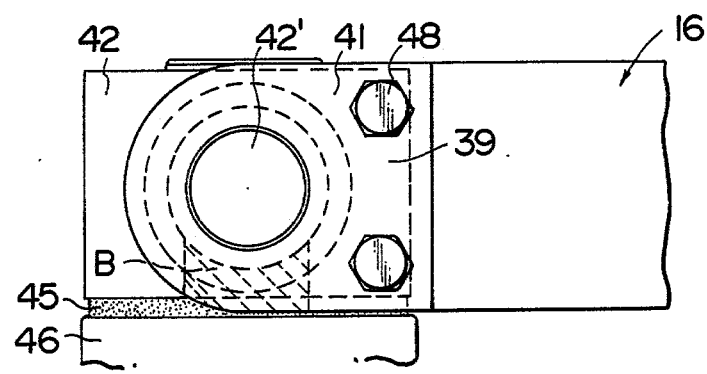
Figure 12:
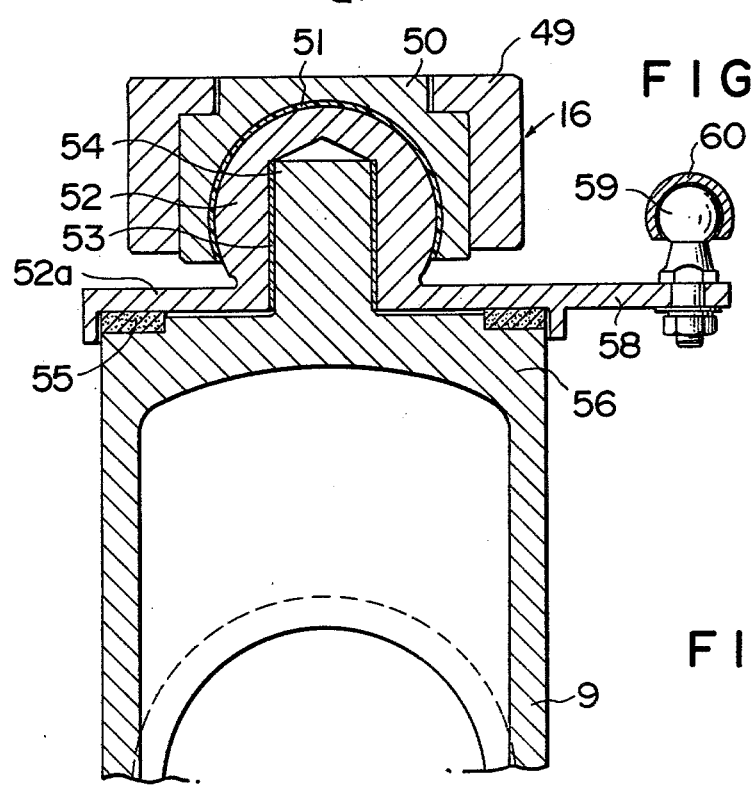
Figure 13:
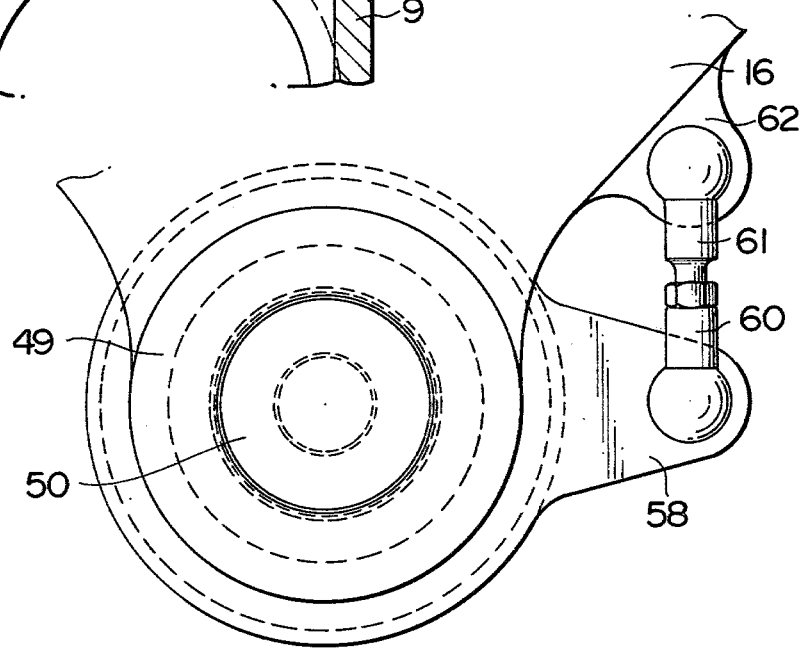
Figure 14:
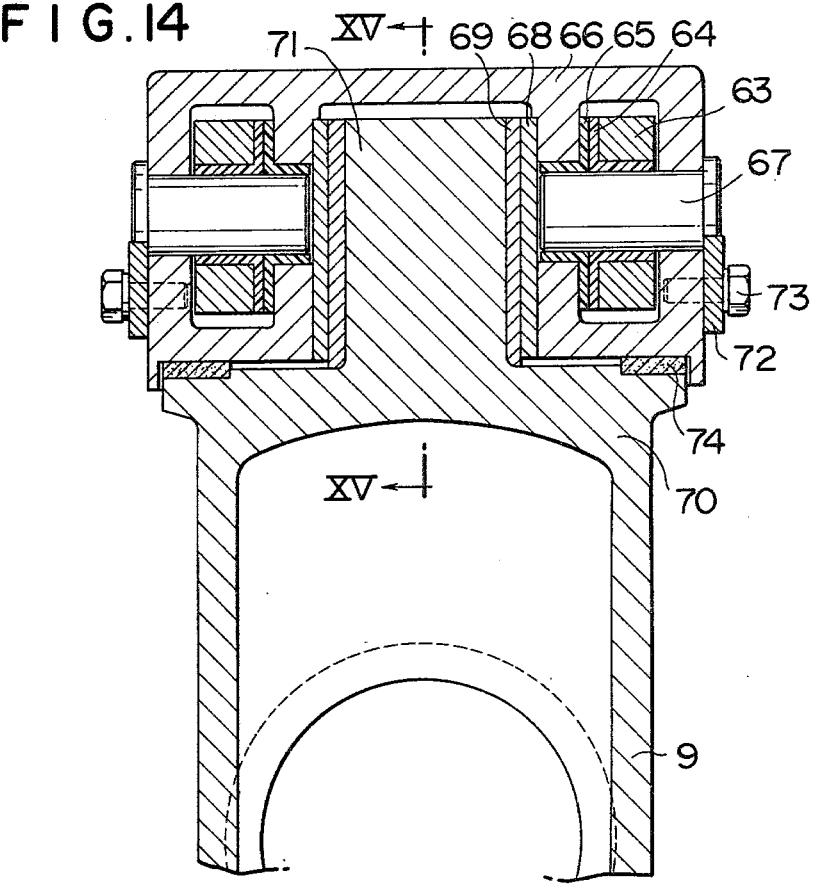
Figure 15:
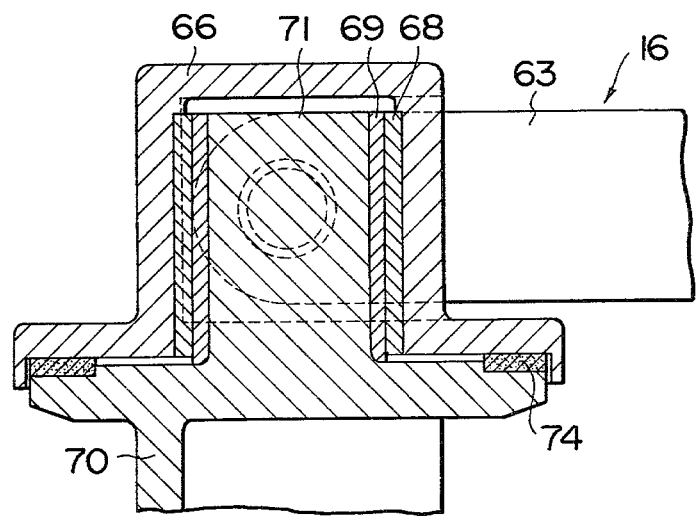

FIGS. 6 (a) and (b) are plan and front views showing the principle of caster adjustment;

FIG. 7 is a perspective view showing various force components acting in the suspension mechanism;

FIG. 8 is a fragmentary front view partly in section of a suspension mechanism wherein an air spring unit is installed in an inclined manner;

FIG. 9 is a fragmentary sectional view showing one example of the connection between the axle and the support link;

FIG. 10 is a view similar to FIG. 9 but showing another embodiment;

FIG. 11 is a side elevational view of the mechanism shown in FIG. 10;

FIG. 12 is a view similar to FIGS. 9 and 10 but showing a further embodiment;

FIG. 13 is a top elevational view of the mechanism shown in FIG. 12;

FIG. 14 is a view similar to FIGS. 9, 10 and 12 but showing another embodiment; and, FIG. 15 is a sectional view taken along the line XV—XV in FIG. 14.

Referring now to the drawings, particularly to FIGS. 1 and 2, the vehicle shown therein includes a body 1 and a pair of steerable, rubber-tired running wheels 2 mounted at each end portion of the body 1. A pair of guide wheels 3 are provided at each end portion of the body 1 and located longitudinally outwardly with respect to the running wheels 2. The running wheels 2 are adapted to run along running tracks 4 while the guide wheels 3 roll along guide rails 5 provided at transversely outboard portions with respect to the running tracks 4.

The vehicle is adapted to run in the direction shown by an arrow in FIG. 1. In the front wheel assembly, the paired guide wheels 3 are connected together by a beam 6 which is in turn connected through a steering rod 7 with a steering arm 8. The steering arm 8 is formed integrally with or secured to an axle 9 of one of the paired running wheels 2 so that any displacement of the guide wheels 3 with respect to the body 1 is transmitted through the steering rod 7 and the arm 8 to the axle 9 to rotate the same for effecting a steering movement of the running wheel 2 to which the arm 8 is secured. The other running wheel 2 has an axle 10 which is connected through a tie rod 11 with the axle 9 of the first mentioned running wheel 2 so that the paired wheels 2 are steered simultaneously.

In the rear wheel assembly, the steering rod 7 is connected with the guide wheel beam 6 through a steering rod 12 and a reversing lever 13 which is mounted on the body 1 through a fulcrum bracket 14. Thus, any displacement of the guide wheels 3 with respect to the vehicle body 1 is transmitted to the steering rod 7 in the direction opposite to that in the front wheel assembly.

Referring to FIG. 2, it will be noted that each of the axles 9 and 10 is connected at upper and lower portions with upper and lower links 16 and 19, respectively, through ball joints 15 and 15' which define an axis for steering. As shown in FIG. 1, the upper link 16 is of a bifurcated configuration and connected through pins 18 to a gear casing 21 at longitudinally spaced portions. The gear casing 21 is mounted on a transversely extending beam 25 of the vehicle body 1. The lower link 19 is of a similar configuration and connected through pins 20 to the gear casing 21.

The upper and lower links 16 and 19 are parallel with each other and have the same arm lengths. An air spring unit 17 is provided between the upper link 16 and the body 1. A known type of leveling valve may be associated with the air spring unit 17 for controlling the pressure in the unit 17 so that the links 16 and 19 are normally maintained horizontal.

The running wheels 2 are connected through drive shafts 22 with a gear mechanism provided in the gear casing 21 so as to be driven by a suitable prime mover such as an electric motor. In the illustrated arrangement, the upper ball joint 15 is always subjected to a vertical load which is applied through the air spring unit 17. It will therefore be understood that a frictional force is produced in the ball joint 15 during a steering movement.

Referring now to FIGS. 3 and 4 which show another embodiment of the present invention, the upper link 16 is connected with the gear casing 21 through adjustable means. More specifically, the upper link 16 is connected through pins 18 with brackets 23 which are mounted on the gear casing 21 through shims 24. It will therefore be understood that the transverse positions of the pins 18 can be adjusted by changing the thicknesses of the shims 24. Camber angle of the wheel 2 can be varied through simultaneous and equal adjustments of the shims 24 for the paired brackets 23. For example, as shown in FIG. 5, the camber can be changed by an angle from the position shown by solid lines to the position shown by dotted lines by increasing the thickness of the shim 24 for a value $\delta_1$. Similarly, the camber angle may be decreased by decreasing the thickness of the shim. In FIG. 5, the angle $\phi$ of camber adjustment is a function of $\delta_1 h$.

When the thickness of the shims 24 for the paired brackets 23 are adjusted in the opposite directions, caster angle of the wheel is adjusted. As shown in FIGS. 6 (a) and (b), when the thickness of the shims 24 for one bracket 23 is increased by $\delta_2$ and that for the other bracket 23 is decreased by $\delta_3$, the ball joint 15 on the upper link 16 is displaced longitudinally by a distance $\delta_4$ so that the axle is inclined by an angle $\alpha$ to effect a change in the caster angle. Thus, it becomes possible to correct the caster angle if there is any discrepancy. The angle $\alpha$ can be represented by $\delta_4 h$ which is equal to $(\delta_2+\delta_3/b)\cdot 1/h$. Where a wide range of caster adjustment is desired, the links may be connected with the vehicle body through ball joints in order to ensure smooth movements.

In FIG. 7, there are shown force components acting in the above described mechanism. In the drawing, the wheel 2 is subjected at its tread surface to an external force having a longitudinal component P and a transverse component Q. Further, the wheel 2 is applied with a vertical reaction force W from the track. Equilibrium of force components are represented by the following equations.

$$Q_1 = \frac{e}{h} W - \frac{r + h_2}{h} Q - \frac{h_2 + h_3}{h} \cdot \frac{e}{a} P$$

$$Q_2 = \frac{e}{h} W - \frac{r + h_1}{h} Q + \frac{h}{h_1 - h_3} \cdot \frac{e}{a} P$$

$$P_1 = \frac{r + h_2}{h} P$$

$$P_2 = \frac{h}{r - h_1} P$$

$$Q_3 = \frac{Q_1}{2} - \frac{1}{b} P_1$$

$$Q_4 = \frac{Q_1}{2} + \frac{1}{b} P_1$$

$$Q_5 = \frac{Q_2}{2} - \frac{1}{b} P_2$$

$$Q_6 = \frac{Q_2}{2} + \frac{1}{b} P_2$$

where:

$$R = (e/a)P$$

From the equations, it will be understood that the transverse force components $Q_5$ and $Q_6$ at the connections between the upper link 16 and the vehicle body 1 can be maintained at positive values under the external force components P and Q at the tread surface of the running wheel 2 by properly determining the distance e between the steering axis and the point of contact of the wheel 2 to the track surface. This is advantageous in that the shims 24 can be always maintained under compression in the arrangement shown in FIG. 4.

Where the distance e is of sufficiently large value, there will be substantially no change in the directions of the force components $Q_1$ through $Q_6$. Therefore, it becomes possible to maintain the camber and caster angles substantially unchanged even when there is any change in the direction of the force component Q, which change may possibly be produced when the joints are worn and slight gaps are formed therein.

Actual design may be made in such a way that the force components $Q_3$ through $Q_6$ do not have negative values under the external force components P and Q of such values that are often applied to the wheel 2 in normal vehicle operations. As an example, with $e=215^{mm}$, $r=502^{mm}$, $h_1=h_2=h_3=190^{mm}$, $1=550^{mm}, a=400^{mm}$, $b=620^{mm}$, $P=0.1W$ and $Q=0.1W$, then $Q_3=0.0034W$, $Q_4=0.3265W$, $Q_5=0.1338W$ and $Q_6=0.3499W$. Thus, the force components $Q_3$ through $Q_6$ have positive values.

The fact that the values $Q_5$ and $Q_6$ are positive will mean that the lower link 19 is under tension. It is therefore desirable in the arrangement of FIG. 3 to provide brackets for receiving the pins 20 integrally with the gear casing so that they can reliably withstand the tensile force. An adequate adjustment for alignment can be provided only at the connections of the upper link so that the lower link may be formed without any adjusting means.

FIG. 8 shows an example of air spring arrangement in which an air spring unit is mounted in an inclined position on the horizontal upper link 16. The air spring unit is comprised of a diaphragm 26, an upper fitting 27 and a lower fitting 28. The upper fitting 27 is formed with an air inlet port 30 and the lower fitting 28 with a pad 29. The diaphragm 26 is so arranged that it has an acting plane A—A which substantially contains the aligned axes of the pins 18. With this arrangement, the air spring unit functions with little misalignment between the upper and lower fitting 27 and 28 and it is possible to ensure a prolonged life of the diaphragm 26.

FIG. 9 shows the details of the connection between the upper link 16 and the axle in the arrangement shown in FIGS. 1 and 2. The link 16 has a bifurcated end 31 and the ball joint 15 is comprised of an outer race 32, a plastic liner 33 provided inside the outer race 32 and an inner race 34 having a spherical outer surface and slidably received in the liner 33. A pin 35 is inserted through the inner race 34 and the bifurcated end 31 of the link 16 and secured in position by a nut 36. The outer race 32 of the ball joint is fitted to the upper portion 37 of the axle 9 or 10 which has a shaft portion 38 to be fitted to the wheel 2. As previously described, the ball joint 15 is subjected to a vertical load so that a frictional force is produced in the joint during steering movement to resist such movement. It is therefore possible to prevent a divergent steering movement under a high speed operation of the vehicle. For the purpose of increasing this effect, the plastic liner 33 may be made of a material having a high frictional coefficient.

FIGS. 10 and 11 show an example wherein the ball joint in the previous example is substituted by a cross type joint. The upper link 16 has a bifurcated end 39 to which bearings 41 are attached. Bearings 41 have aligned holes which are provided with plastic liner 40. The cross type joint includes a body 42 which is rotatably fitted to a bush 44 fixed to a pin portion 43 formed on the axle 9 or 10. Between the body 42 of the joint and the upper portion 46 of the axle, there is provided a thrust washer 45 for transmitting the vertical load to the axle. It will be understood that a frictional force is produced at the thrust washer 45 during a steering movement to resist the same and, in this instance, the material of the thrust washer 45 may be appropriately selected to provide an appropriate amount of frictional force.

The body 42 of the joint has a pair of oppositely extending aligned pin portions 42' which are received by the holes in the bearings 41. Referring to FIG. 11, it will be noted that the bifurcated end portion 39 of the link 16 is cut-off at shadowed portion B so that the pin portion 42' of the joint body can be passed through the cut-off portion B in assembling operation. After the pin portion 42' is thus inserted into the bifurcated end 39 of the link 16, the bearing 41 is fitted to the pin portion 42' and thereafter secured to the link 16 by means of bolts 48. The bearing 41 functions as a reinforcement of the cut-off portion B of the link 16.

FIGS. 12 and 13 show another embodiment adopting a ball joint. The upper link 16 has a bifurcated end 49 to which an outer race 50 of the joint is fitted. The outer race 50 has an inner spherical surface provided with a plastic liner 51. A spherical member 52 is disposed in the outer race 50 and rotatably fitted to a pin portion 54 on the axle 9 through a bush 53. The spherical member 52 is integrally formed at the lower portion thereof with a disc portion 52a which is supported through a friction member 55 on the upper portion 56 of the axle 9. Thus, a frictional force is produced between the friction member 55 and the upper portion 56 of the axle 9 during steering movement. The friction member is in the form of a ring having a large diameter so that there is little change in the diameter of the friction producing surface. Thus, it is possible to provide a proper friction by appropriately determining the inner and outer diameters of the friction member 55. The friction device is further provided with an arm 58, a ball stud 59 and ball joints 60 and 61 so as to hold the disc portion 52a against rotation. The upper link 16 is provided with a receptable 62 for the ball joint 61.

FIGS. 14 and 15 show another embodiment adopting a cross type joint. The upper link has a bifurcated end 63 which is fitted with bushes 64. The joint includes a body 66 which has bushes 65 fitted thereto. The body 66 and the bifurcated end portion 63 are connected together by a pair of aligned pins 67. The joint body 66 further has a bush 68 fitted thereto and rotatably supported through the bush 68 by a pin portion 71 formed on the upper portion 70 of the axle 9. The pins 67 are held in positions by retaining plates 72 which are secured to the joint body 66 by means of bolts 73. Between the joint body 66 and the upper portion 70 of the axle, there is disposed a friction member 74 of annular form to produce a friction force between the body 66 and the upper surface of the axle 70.

The invention has thus been shown and described with reference to specific embodiments, however, it should be noted that the invention is in no way limited to the details of the illustrated structures but changes and modifications may be made without departing from the scope of the appended claims.

I claim:

1. An automatically guided vehicle comprising a body and rubbertired steerable running wheels, each having an axle, a suspension system including transversely extending upper and lower link arms which are parallel with each other and have equal arm lengths, each of said links having one end connected with the wheel axle through universal joint means at least for steering movement about a vertical axis and a rotative movement about a longitudinal axis and the other end connected at two longitudinally spaced portions with the vehicle body for rotative movement about a second longitudinal axis, at least one of the link arms being connected with the vehicle body at said longitudinally spaced portions for independent transverse adjustments, air spring means disposed between one of the links and the vehicle body for normally maintaining said links substantially horizontally to thereby maintain the associated wheel always vertical.

2. Suspension system in accordance with claim 1 in which said universal joint means is of a spherical type.

3. Suspension system in accordance with claim 1 in which said universal joint means is of a cross-type.

4. Suspension means in accordance with claim 1 in which said universal joint means includes a thrust surface of a material of high frictional coefficient.

5. Suspension means in accordance with claim 1 in which the universal joint means includes friction means for producing a force opposing rotation of the universal joint means during a steering movement.

6. Suspension system in accordance with claim 1 in which said one of the link arms is connected with vehicle body through shim means so that one of the two longitudinally spaced portions of said other end of said one link arm is transversely adjustable with respect to the other.

7. Suspension system in accordance with claim 1 in which said one link arm is the upper one.

8. Suspension system in accordance with claim 1 in which said air spring means is positioned inclined with respect to the vertical axis between the body and the link arm carrying the air spring means.

* * * * *